UNITED STATES PATENT OFFICE.

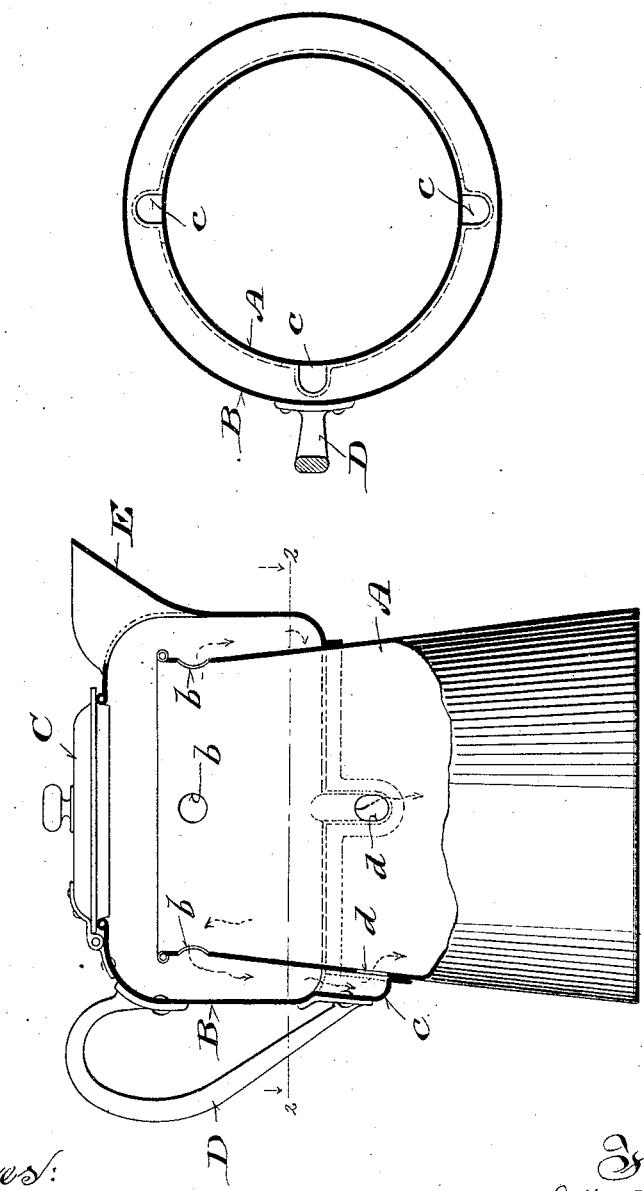

OTTO F. REGNELL, OF MILWAUKEE, WISCONSIN.

COFFEE-POT.

No. 880,096.   Specification of Letters Patent.   Patented Feb. 25, 1908.

Application filed April 6, 1907. Serial No. 366,692.

*To all whom it may concern:*

Be it known that I, OTTO F. REGNELL, a citizen of the United States, and resident of Milwaukee, in the county of Milwaukee and State of Wisconsin, have invented certain new and useful Improvements in Coffee-Pots; and I do hereby declare that the following is a full, clear, and exact description thereof.

The improvements consist in what is herein shown, described and claimed; the object of the invention being to provide simple, economical coffee-pots organized with especial reference to preventing boiling over and to rapid infusion.

Figure 1 of the accompanying drawings represents a partly sectional elevation of a coffee-pot made in accordance with my invention, and Fig. 2, a horizontal section of same on the plane indicated by line 2—2 in Fig. 1.

Referring by letter to the drawings, A indicates an open top vessel preferably provided with wall apertures $b$, a suitable distance below its rim. In water-tight union with the major part of the vessel approximately midway between the bottom and rim thereof to inclose the same is a shell B the dimensions of this shell being such that considerable space is had between its wall and that of said vessel, as well as between its top and the vessel rim. In hinge-connection with the shell is a lid C for an opening in the top of same, and a handle D and spout E are provided in connection with said shell opposite one another. One end of the handle is shown fastened to a depending duct $c$ of the shell that communicates with the vessel A through an aperture $d$ in the same, and other similar ducts may be employed between said shell and vessel, as shown by dotted lines in Fig. 1 and full lines in Fig. 2.

In practice, ground coffee and water to infuse the same are introduced into the vessel A through the opening in the shell B and this opening closed by the lid C of the pot as a whole. When the contents of the vessel boil up, they escape through the apertures $b$ of same into the adjacent space within the shell and find their way back into said vessel through the duct or ducts $c$ aforesaid, whereby said pot is prevented from boiling over and the circulation of said contents tends to more rapid infusion of the ground coffee than is possible in coffee-pots of ordinary construction. Because of the apertures $b$ in the vessel A the contents of said vessel are not liable to rise above said apertures when on the boil. Hence only a small quantity of those lighter portions of the ground coffee that float for a time find their way into the shell portion of the pot.

I claim:

A coffee-pot comprising an open top vessel, an upwardly extended shell of greater diameter than the vessel with which it is for the most part in water-tight union outside the same approximately midway of the bottom and rim thereof, said shell being provided with a spout-extension; a hinged lid for an opening in the top of the shell, ducts leading from the lower portion of the shell into said vessel, and a handle attached to the aforesaid shell opposite the spout-extension of same.

In testimony that I claim the foregoing I have hereunto set my hand at Milwaukee in the county of Milwaukee and State of Wisconsin in the presence of two witnesses.

OTTO F. REGNELL.

Witnesses:
N. E. OLIPHANT,
GEORGE FELBER.